US010013472B2

(12) United States Patent
Driesen et al.

(10) Patent No.: US 10,013,472 B2
(45) Date of Patent: Jul. 3, 2018

(54) ALIASES FOR ACCESSING SHARED TABLES DURING PROVISION OF CONTINUOUS ACCESS DURING APPLICATION UPGRADE

(71) Applicants: Volker Driesen, Heidelberg (DE); Nicolai Jordt, Bad Langbrücken (DE); Martin Mayer, Heidelberg (DE); Wieland Hoprich, Mannheim (DE); Andrey Engelko, Karlsruhe (DE); Steffen Meissner, Heidelberg (DE); Peter Schreiber, Wiesloch (DE); Levke Bentzien, Heidelberg (DE)

(72) Inventors: Volker Driesen, Heidelberg (DE); Nicolai Jordt, Bad Langbrücken (DE); Martin Mayer, Heidelberg (DE); Wieland Hoprich, Mannheim (DE); Andrey Engelko, Karlsruhe (DE); Steffen Meissner, Heidelberg (DE); Peter Schreiber, Wiesloch (DE); Levke Bentzien, Heidelberg (DE)

(73) Assignee: SAP SE, Walldorf (DE)

( * ) Notice: Subject to any disclaimer, the term of this patent is extended or adjusted under 35 U.S.C. 154(b) by 423 days.

(21) Appl. No.: 13/730,753

(22) Filed: Dec. 28, 2012

(65) Prior Publication Data
US 2013/0238555 A1   Sep. 12, 2013

Related U.S. Application Data

(60) Provisional application No. 61/607,545, filed on Mar. 6, 2012.

(51) Int. Cl.
*G06F 17/30* (2006.01)
*G06F 12/16* (2006.01)

(52) U.S. Cl.
CPC ........ *G06F 17/30578* (2013.01); *G06F 12/16* (2013.01); *G06F 17/303* (2013.01); *G06F 17/30091* (2013.01)

(58) Field of Classification Search
CPC .... G06F 11/1433; G06F 12/16; G06F 17/303; G06F 17/30578; G06F 17/30091
USPC ........ 717/168, 173, 178, 170, 171; 726/1, 4, 726/3, 8, 2, 24, 26, 27, 30, 5, 7; 711/E12.001, 141, 154, 162, E12.008, 711/E12.017, E12.019, E12.023, E12.103, 711/103, 147, 148, 149, 167; 705/1.1, 3, (Continued)

(56) References Cited

U.S. PATENT DOCUMENTS 6,304,882 B1 * 10/2001 Strellis ................ G06F 11/2064
7,523,142 B2 *  4/2009 Driesen et al.
(Continued)

*Primary Examiner* — Jay A Morrison
*Assistant Examiner* — Ken Hoang
(74) *Attorney, Agent, or Firm* — Mintz Levin Cohn Ferris Glovsky and Popeo, P.C.

(57) ABSTRACT

Continuous access to an application and associated data is provided during a modification (for example, an upgrade) of the application. Shared tables are used to perform parallel changes in databases associated with an original database schema, a temporary database schema, and an upgraded database schema. Aliases are used to access shared tables from some database schemas. The use of shared tables obviates a separate merging of data written by different tools and/or systems during an upgrade of the application. Related methods, apparatuses, systems, techniques and articles are also described.

20 Claims, 12 Drawing Sheets

(58) Field of Classification Search
USPC .......... 705/2, 26.1, 34, 344, 35, 37;
707/E17.005, 769, 999.204, E17.014,
707/E17.044, E17.108, 609, 613, 695,
707/705, 804, 999.2
See application file for complete search history.

(56) References Cited

U.S. PATENT DOCUMENTS

| | | | |
|---|---|---|---|
| 8,229,579 B2* | 7/2012 | Eldridge et al. | 700/31 |
| 2002/0178077 A1* | 11/2002 | Katz et al. | 705/26 |
| 2004/0015953 A1* | 1/2004 | Vincent | 717/173 |
| 2005/0251523 A1* | 11/2005 | Rajamani et al. | 707/100 |
| 2008/0115134 A1* | 5/2008 | Elliott | G06F 9/4856 718/101 |

* cited by examiner

ALIASES FOR ACCESSING SHARED TABLES DURING PROVISION OF CONTINUOUS ACCESS DURING APPLICATION UPGRADE

RELATED APPLICATION

This application claims priority under 35 U.S.C. § 119 to U.S. Provisional Application Ser. No. 61/607,545, filed Mar. 6, 2012, entitled "TRUE ZERO DOWNTIME," the disclosures of which are hereby fully incorporated by reference.

TECHNICAL FIELD

The subject matter described herein relates to a use of aliases to access shared tables by different database schema while providing continuous access of an application to a user during an upgrade of the application.

BACKGROUND

Some business entities (for example, companies that make enterprise software to manage business operations and customer relations) provide application software (i.e., each known as an "application") to their customers. When an application needs to be upgraded to a new version, the application and associated data may be inaccessible for a significant downtime (for example, a few hours) during the upgrade. Moreover, all the users using the application may be synchronously logged out for the upgrade to occur. Such inaccessibility during the long downtime and the synchronous unplanned logout of the customers can be inconvenient to the customers, and may result in a loss of revenue and/or loss in profits for the business entities.

SUMMARY

In some implementations, methods and apparatus, including computer program products, and related systems are disclosed for enabling and providing continuous access to an application and associated data to at least one user during a modification (for example, an upgrade) of the application. Shared tables may be used to perform parallel changes in data accessed by an original database schema, a temporary database schema, and an upgraded database schema. Aliases may be used to access shared tables from some database schemas. The use of shared tables may obviate a separate merging, during an upgrade of the application, of data written by different tools and/or systems.

In some implementations, there is provided a method for obtaining, using one or more data processors, a first data-set characterizing a first version of an application. In some implementations, the first data-set may include a plurality of tables that are arranged according to an original database schema characterizing a first database structure and a second database structure. In some implementations, the first database structure may characterize an arrangement of data in the first version of the application, and the second database structure may characterize a desired arrangement of data in a second version of the application. In some implementations, the method may also include generating, using one or more data processors, a copy of a first portion of the first data-set on a temporary system. In some implementations, the data of the temporary system may be arranged according to a temporary database schema. In some implementations, the temporary database schema may include a first set of one or more aliases to access a second portion of the first data-set. In some implementations, selective access to the data of the temporary database schema may be continuously enabled and provided to a user when the upgrade of the application is being performed. In some implementations, the method may also include upgrading, using one or more data processors, the first data-set to generate a second data-set associated with an upgraded application. In some implementations, the updating may be based on the second database structure and may be performed asynchronously for a plurality of users. In some implementations, the second data-set may be arranged according to the second database structure of an upgrade database schema. In some implementations, the upgrade database schema may include a second set of one or more aliases to access a third portion of the first data-set. In some implementations, the method may also include enabling, using one or more data processors, access to the user to the second data-set after the upgrade of the application.

The above methods, apparatus, and computer program products may, in some implementations, further include one or more of the following features.

In some implementations, the application may be executed in a computing landscape that includes an enterprise resource planning system, a customer relationship management system, and a business warehouse system.

In some implementations, the first version of the application may be an original version of the application, and the second version of the application may be an upgraded version of the application.

In some implementations, the plurality of tables may include a first plurality of tables associated with the first database structure and a second plurality of tables associated with the second database structure. In some implementations, the first plurality of tables may include repository tables, temporary data operational tables, operational tables, and application tables that associated with the first database structure. In some implementations, the second plurality of tables may include repository tables, temporary data operational tables, operational tables, and application tables that associated with the second database structure.

In some implementations, the method may also include generating, using one or more data processors, a shadow database schema. In some implementations, the shadow database schema may characterize the second database structure and may include a third set of one or more aliases to access a fourth portion of the first data-set. In some implementations, the fourth portion of the first data-set may include repository tables associated with the second database structure and temporary data operational tables associated with the second database structure.

In some implementations, the first portion of the first data-set may include operational tables that are not imported during the upgrade and that are modified online during the upgrade. In other implementations, the first portion of the first data-set may include application tables that are not imported during the upgrade and that are modified online during the upgrade. In yet other implementations, the first portion of the first data-set may include application tables that are not imported during the upgrade and that are modified offline during the upgrade. In yet other implementations, the first portion of the first data-set may include may include application tables that are imported during the upgrade and that are not modified during the upgrade.

In some implementations, the second portion of the first data-set may include operational tables that are not imported during the upgrade and that are not modified during the upgrade. In other implementations, the second portion of the first data-set may include application tables that are not imported during the upgrade and that are not modified during the upgrade.

In some implementations, the third portion of the first data-set may include operational tables that are not imported during the upgrade and that are not modified during the upgrade.

In some implementations, the first data-set may be obtained from a central database implemented at a central server. In some implementations, the central server may be accessed by the temporary system via a network. In some implementations, the network may be the Internet.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the application continuously remains accessible to the users during an upgrade of the application, thereby eliminating or minimizing the downtime. Such a continuous accessibility during the downtime is cost-efficient and time-efficient for the users. Moreover, the users are allowed to log-out asynchronously (that is, individually and independent of the log-out time of other users) for the upgrade to occur on their computing device. Accordingly, any inconvenience caused to the users due to a forcible log-out is prevented, thereby resulting in loyalty amongst users. Such a user-satisfaction can result in an increased profit and increased revenue for those users and the application provider. Furthermore, different database schemas used before the upgrade of the application, during the upgrade, and after the upgrade, access shared tables located in a central database. Such a use of shared tables prevents a separate synchronization of data associated with different database schemas, thereby saving time and computing resources, such as processing power, processor speed, memory, and other resources.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
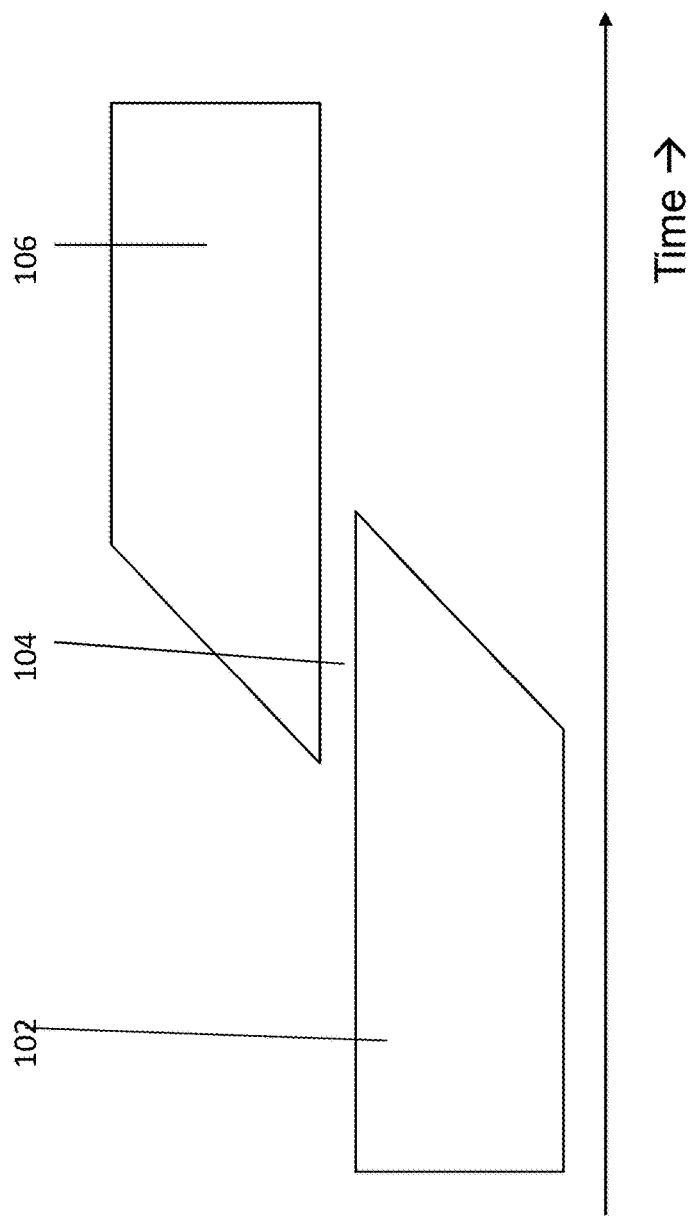
FIG. 1 is a diagram illustrating a timeline for a continuous provision of access to an application and associated data during an upgrade of the application and during a testing of the upgrade.

FIG. 1 is a diagram 100 illustrating a timeline for a continuous provision of access to an application and associated data during an upgrade of the application and during a testing of the upgrade.

At 102, access to a first version of the application is enabled. The access can be provided to a user of the application via a computer or computer network. At 104, access to an upgraded/second version of the application is enabled and asynchronously provided to the user upon individual log-out. The user is not logged out synchronously and/or automatically with a log out of other users. Instead, the user is allowed to log-off when the user desires, and the upgrade occurs when each user re-logs-on individually and independent of other users. During the upgrade, the users are provided a continuous selective access to the application. At 106, access to the upgraded/second version of the application is enabled and provided to the user.

In some alternate implementations, the users may not be required to re-logon to access the upgraded application, but the upgrade needs to be reloaded into the database.

Continuous or uninterrupted access to the functionality of the application is important in various industries, such as financial services, accounting, customer services, service providers, and/or other industries.

The term "user," as noted herein, can mean one or more of: customers, clients, entities, business units (for example, corporations, partnerships, and other units), groups of people, individuals, and the like.

Figure 2:
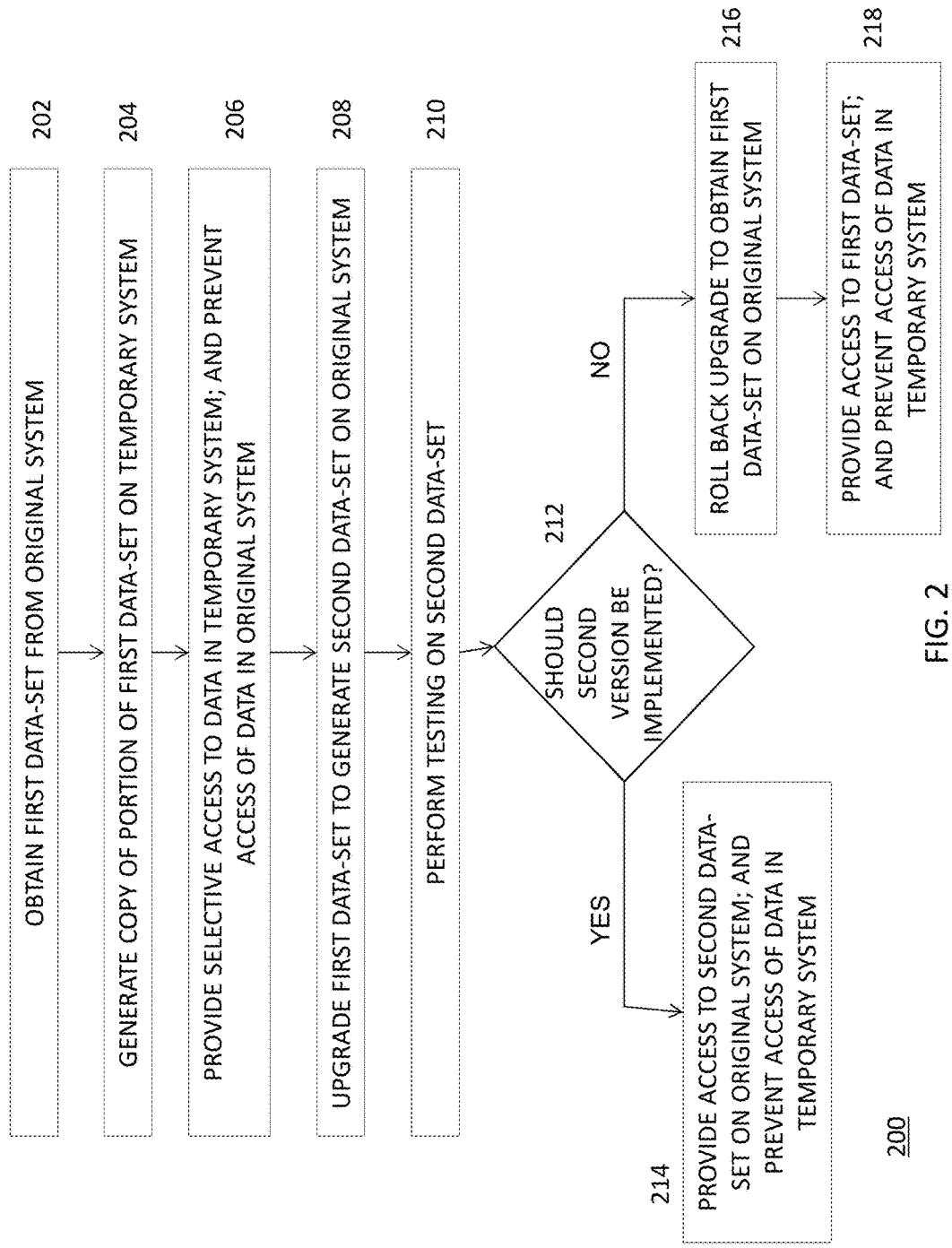
FIG. 2 is a flow diagram illustrating a method of enabling and providing a continuous access to an application during an upgrade of the application and during a testing of the upgrade.

FIG. 2 is a flow diagram illustrating a method 200 of enabling and providing a continuous access to an application during an upgrade of the application and during a testing of the upgrade. A first version of the application is upgraded to a second version of the application.

At 202, a first data-set characterizing a first version of the application is obtained from an original system. In some implementations, the original system includes a central server computer that includes a central database. The first data-set can be obtained from the central database via a computing network. The data-set is obtained by a computing system by a data transfer from a memory associated with the original system, or by other electronic means. Initially, access to the first data-set is enabled and provided to a user of the application. In some implementations, the enabling and providing can be a single functional operation. In other implementations, the enabling and the providing can be two or more functional operations.

The first data-set includes tables that are arranged according to an original database schema that characterizes a first database structure and a second database structure. The second database structure is a structure desired for an upgraded version (that is, the second version) of the application. The second database structure is characterized by a shadow database schema. The shadow database schema includes aliases to access a portion of the first data-set. It is computationally efficient to use aliases rather than the entire copy of data, as aliases can prevent a hassle of synchronizing data of different copies at various times. If aliases access data from a central database, changes can be made directly at the central database, and data at the location may not need to be matched continuously with the data at locations of the aliases.

At 204, a copy of a first portion of the first data-set is generated on a temporary system, such as a server computer. In some implementations, the copy is generated when the upgrade of the application becomes available for implementation subsequent to preparation of the upgrade by an application developer. Data of the temporary system is arranged according to a temporary database schema. The temporary database schema includes aliases to access a second portion of the first data-set.

At 206, a selective or restrictive access to the data in the temporary system can be enabled and provided to the user for a time-period after the upgrade becomes available. This selective or restrictive access can characterize a read-only access for some of the first data-set that is changed (for example, by writing the changes when a write access is provided) during the upgrade, and a read and write access for some of the first data-set that may not be changed during the upgrade. Also, at 206, access to the first-data set on the original system is prevented during this time-period. Access to the copy of the first data-set, while the original version of the first data-set is inaccessible, occurs separately/individually for each user of the application after the user separately/individually logs-out of a current session. Such an asynchronous (that is, separate and individual) access can be convenient for the user as the user can continue to work and is not forcibly logged out when an upgrade of the application is available.

At 208, the first data-set on the original system is upgraded to generate a second data-set during a first portion of the time-period. The second data-set characterizes a second/upgraded version of the application. The upgrading occurs based on a structure of the shadow database schema and asynchronously for different users (that is, on a user-by-user basis). The second data-set is arranged according to the second database structure of an upgrade database schema. The upgrade database schema includes aliases to access a third portion of the first data-set.

At 210, testing is performed on the second-data during a second portion of the time-period. The testing determines whether the second data-set should be implemented.

At 212 and towards an end of the second portion of the time-period, it can be determined whether the second data-set should be implemented. This determining includes a computer-implemented check by the system to ensure that there are not any significant bugs or other problems associated with the second version. Thus, the testing of the second data-set can be performed by the system to determine a feasibility of implementing the upgraded data while continuously enabling and providing, to the user, access (more specifically, selective access to the copy on the temporary system) to the application.

At 214, access to the second data-set on the original system can be enabled and provided to the user after the time period if it is determined, at 212, that the second version should be implemented. In some implementations, the enabling and providing can be a single functional operation. In other implementations, the enabling and the providing can include two or more functional operations. Also, at 214, the user is prevented from accessing the copy on the temporary system. Access to the second data-set, while the copy is inaccessible, is enabled asynchronously (for example, separately and individually) for each user of the application after the user separately/individually logs-out of a current session. Such an asynchronous (that is, separate and individual) access can be convenient for the user as the user can continue to work and is not forcibly logged out when an upgrade of the application is available.

At 216, changes performed by the upgrading are rolled-back if it is determined, at 212, that the second version should not be implemented. The rolling-back of changes causes a forming/re-obtaining of the first data-set.

At 218, access to the first data-set that is obtained at 216 and that is implemented on the original system can be enabled and provided to the user after the time-period. Further, access to the data on the temporary system is prevented. The provision of complete access to the first data-set and the prevention of selective access to the data on the temporary system occur asynchronously (for example, separately and individually) for each user of the application after the user separately/individually logs-out of a current session. Such a separate and individual timing for the access can be convenient for the user.

Figure 3:
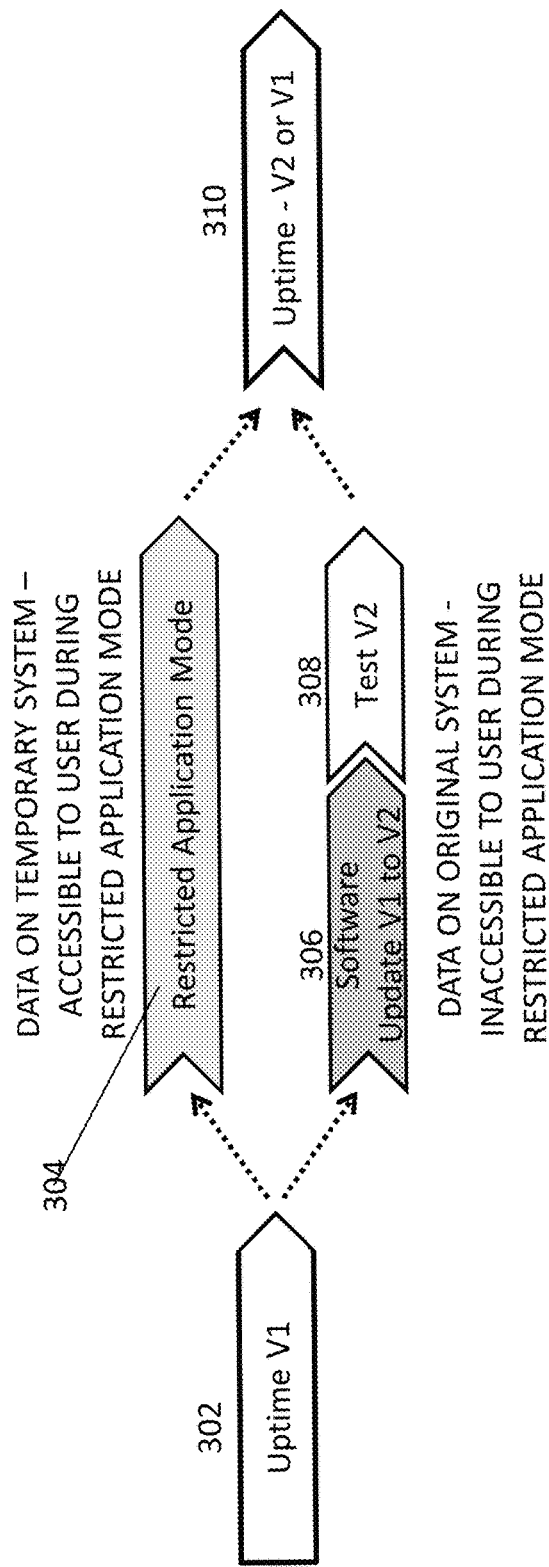
FIG. 3 is a diagram illustrating a continuous provision of access to an application during an upgrade of the application and during a testing of the upgrade.

FIG. 3 is a diagram 300 illustrating a continuous provision of access to an application during an upgrade of the application and during a testing of the upgrade. The upgrade is from a first version V1 of the application to a second version V2 of the application.

At 302, access to a first data-set characterizing a first version V1 of the application is enabled and provided to a user of the application. That is, the first version V1 has an uptime. This first data-set is implemented on an original system, such as a server computer.

When an upgrade for the application becomes available for implementation, a copy of a portion of the first data-set is generated on a temporary system, such as a temporary server. At 304, for a time-period after a time when the upgrade is available, selective/restricted access is provided to the data on the temporary system. The selective access refers to a read-only access for a part (of the first data-set) that is changed during the upgrade, and a read and write access for another part (of the first data-set) that may not be changed during the upgrade. Also, during the time-period, access to the first-data set on the original system is prevented.

At 306, during a first portion of the time-period, the first data-set on the original system is upgraded to form a second data-set characterizing a second version V2 of the application. At 308, during a second portion of the time-period, testing is performed by the system on the second-data.

At 310, if a result of the testing at 308 indicates that the second version should be implemented, access to the second data-set on the original system is enabled and provided to the user, thereby there being an uptime of the second version V2. Also, a provision of access to the data on the temporary system is prevented. If a result of the testing at 308 indicates that the second version should not be implemented, changes performed by the upgrading are rolled-back so as to form/re-obtain the first data-set. Further, at 310, access to the first data-set is enabled and provided to the user, thereby there being an uptime of the first version V1. Further, access to the data on the temporary system is prevented.

Figure 4:
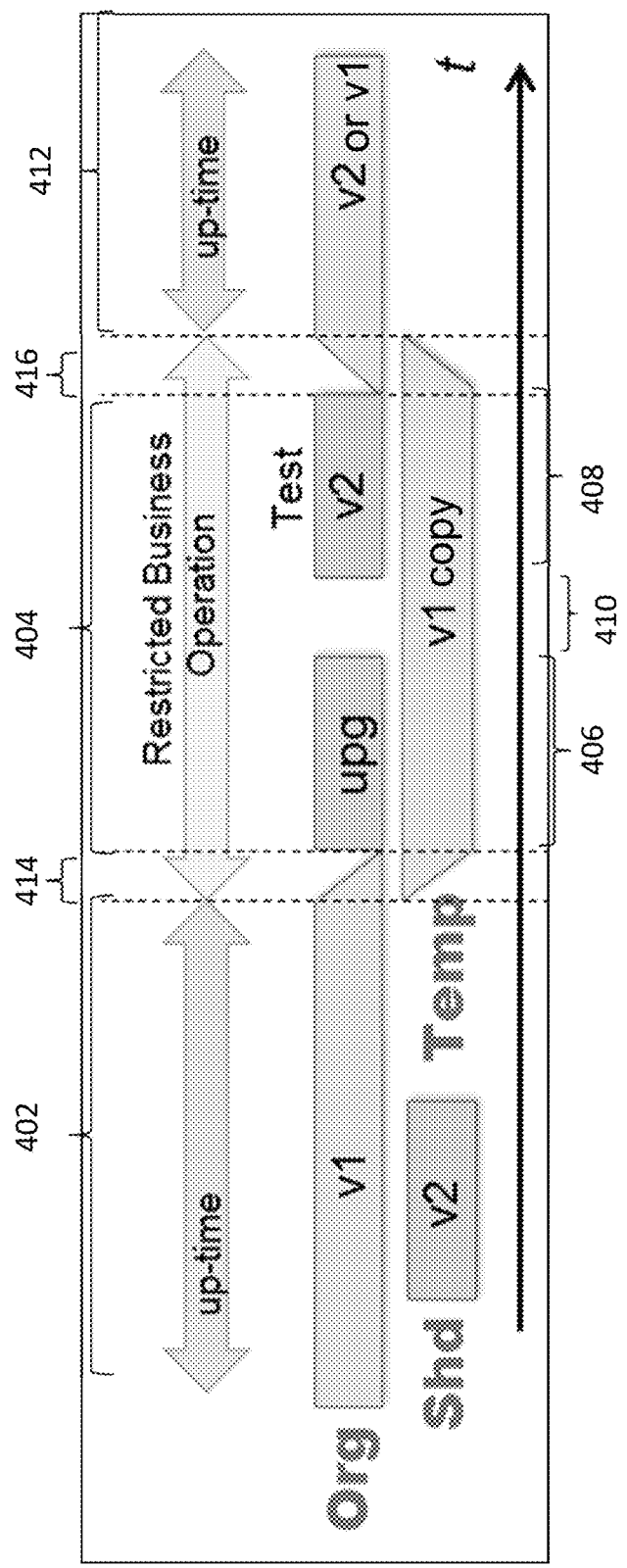
FIG. 4 is a diagram illustrating a timeline for a continuous provision of access to an application during an upgrade of the application and during a testing of the upgrade.

FIG. 4 is a diagram 400 illustrating a timeline for a continuous provision of access to an application during an upgrade of the application and during a testing of the upgrade.

Initially, in a first time-period 402, access to a first data-set characterizing a first version V1 of the application is enabled and provided to a user of the application. That is, the first version V1 on the original system has an uptime during the first time-period 402. At the end of time-period 402, an upgrade for the application becomes available. Subsequently, a copy of a portion of the first data-set is generated on a temporary system, such as a temporary server.

For a second time-period 404, a selective/restricted access is provided to the copy on the temporary system. The selective access characterizes a read-only access for a part of the first data-set that is changed during the upgrade, and a read and write access for another part of the first data-set that is not changed during the upgrade. Also, during the second time-period 404, user-access of the first-data set on the original system is prevented.

On the original system, the upgrade and the testing of the second data-set is performed. During a first portion 406 of the second time-period 404, the first data-set on the original system is upgraded to form a second data-set characterizing a second version V2 of the application. The upgrading includes an import of a customer code, and a customizing of the application based on the imported customer code. During a second portion 408 of the second time-period 404, a computer-implemented testing is performed on the second data-set. In the time-period 410 between the first portion 406 and the second portion, individual customer demand is manually integrated into the application so as to align the second version V2 of the application with a demand (for example, one or more business requirements) of the user.

If a result of the testing during the second time-period 408 indicates that the second version should be implemented, access to the second data-set on the original system is enabled and provided to the user during a third time-period 412. That is, the second version V2 has an uptime during the third time-period 412. Also, a provision of access to the data on the temporary system is prevented.

If a result of testing during the second time-period 408 indicates that the second version should not be implemented, changes performed by the upgrading are rolled-back so as to form/re-obtain the first data-set. Access is provided to the first data-set during the third-time period 412. That is, the first version V1 has an uptime during the third-time period 412. Further, access to the data on the temporary system is prevented.

The transition time-periods 414 and 416 facilitate transitioning of operations between time-periods on both sides (that is, left side and right side in the diagram 400) of each transition time-period.

Figure 5:
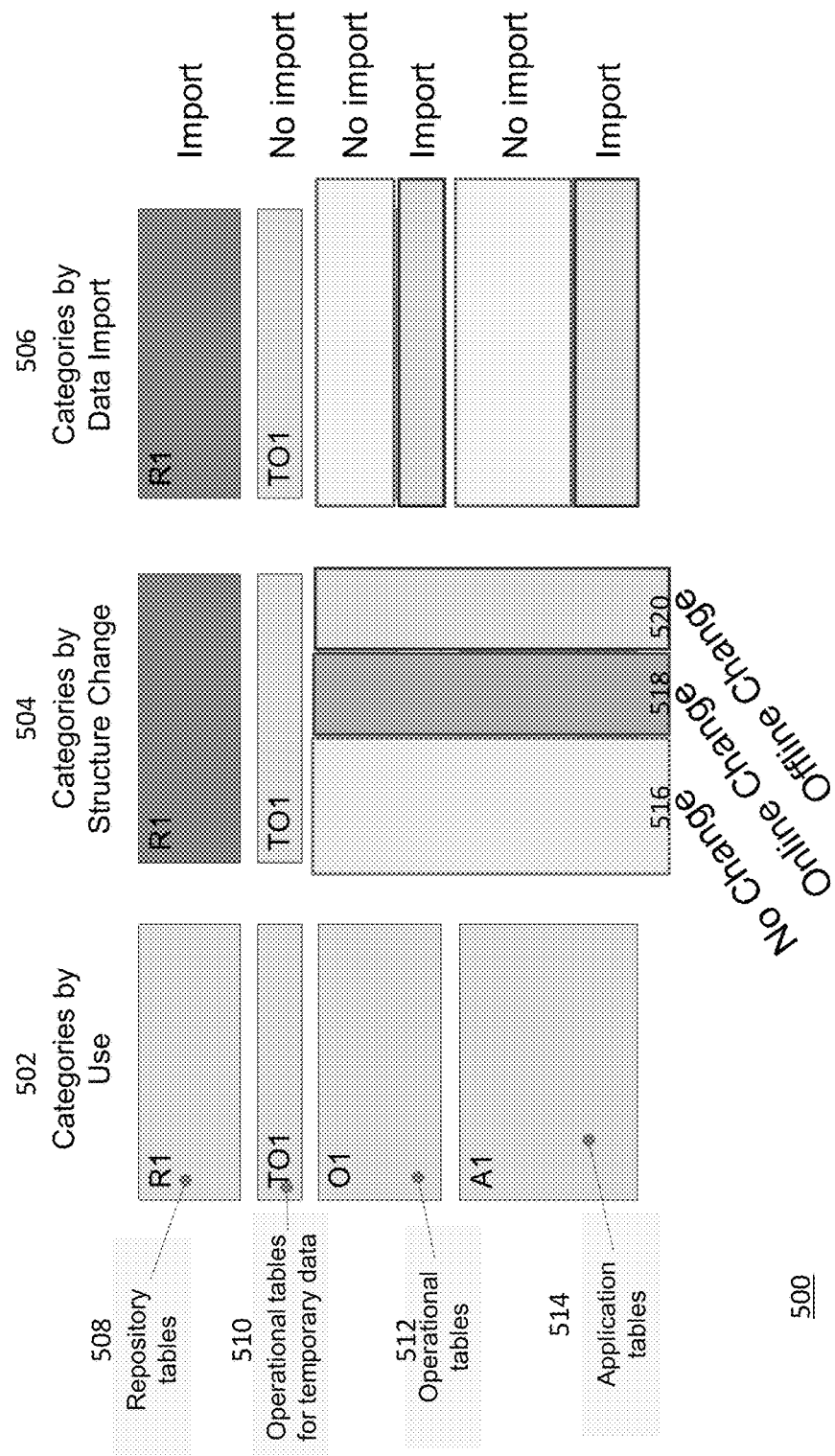
FIG. 5 is a diagram illustrating categories of different partitions within a first-data set in a central database that includes shared tables.

FIG. 5 is a diagram 500 illustrating categories of different partitions within a first-data set in a central database that includes shared tables. These categories include categories by use 502, categories by structure change 504, and categories by content import 506. The categories by use 502 include repository tables R1 508, temporary data operational tables TO1 510, operational tables O1 512, and application tables 514. The categories by structure change 504 include no change 516 during the upgrade, online change 518 during the upgrade, and offline change 520 during the upgrade. The tables with no change 516 include tables O1-1, tables O1-4, tables A1-1, and tables A1-4. The tables with online change 518 include tables O1-2 and tables A1-2. The tables with offline change 520 include tables O1-3 and A1-3. The categories by content import 506 include import and no import. Tables R1 import data; tables O1-1, tables O1-2, and tables O1-3 are prevented from importing data; tables O1-4 import data; tables A1-1, A1-2, and A1-3 are prevented from importing data; and tables A1-4 import data.

Figure 6:
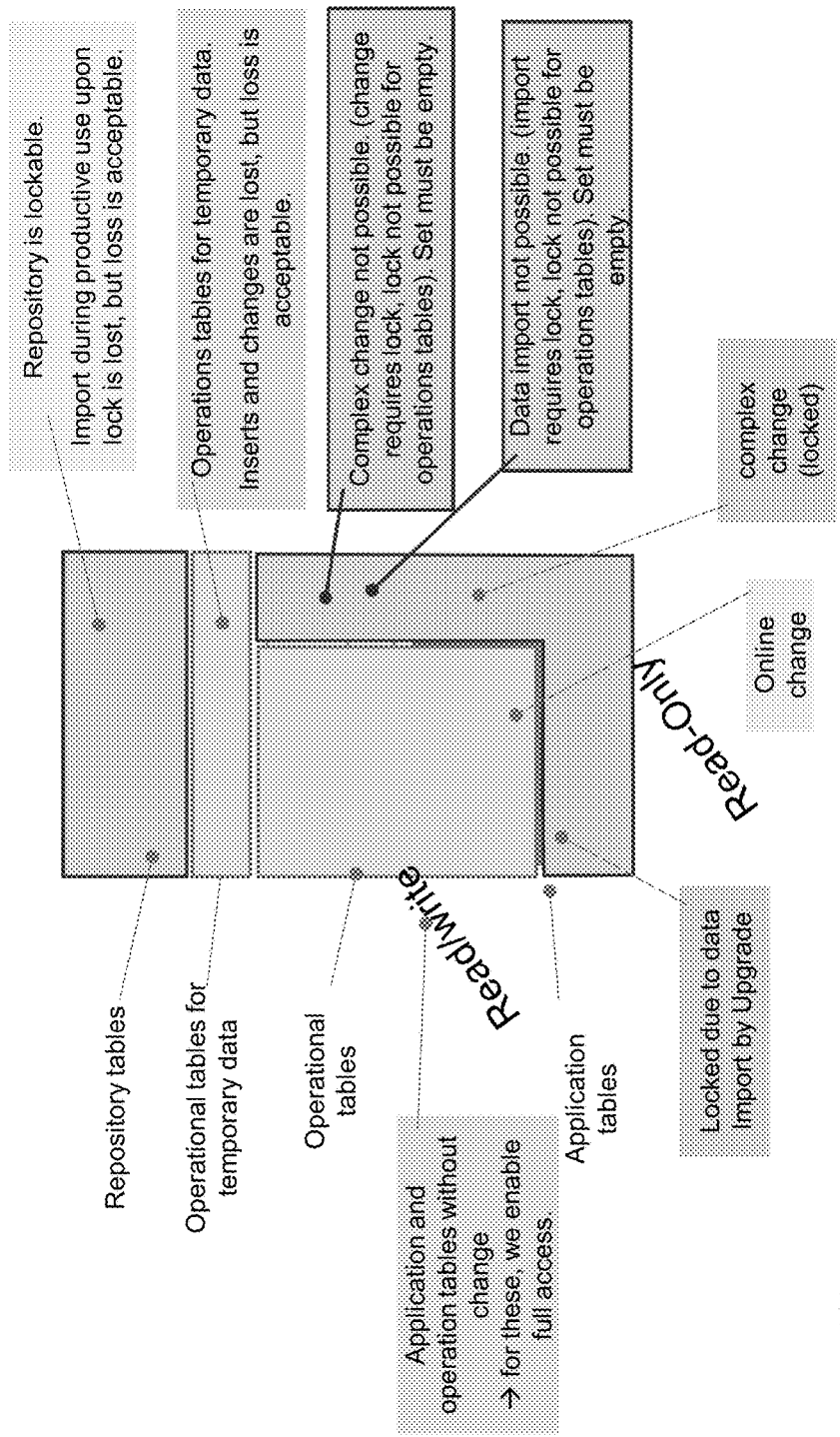
FIG. 6 is a diagram illustrating partitions within a first-data set that includes shared tables, and respective types of access of those partitions by a temporary system.

FIG. 6 is a diagram 600 illustrating partitions within a first-data set that includes shared tables, and respective types of access of those partitions by a temporary system. The repository tables R1 are lockable; and the import during product use upon locking is lost, but such a loss is acceptable. For the temporary data operations tables TO1, the inserts and changes are lost, but such a loss is acceptable. A read and write access is enabled and provided for operation tables and application tables that do not change during the upgrade. A read only access is enabled and provided for operation tables and application tables that change during the upgrade. Tables A1-4 are locked due to data import by upgrade. Tables A1-3 have a complex change and are locked. For tables O1-3, a complex change may not be possible. Although a change may require a lock, locking may not be possible for operations tables.

Figure 7:
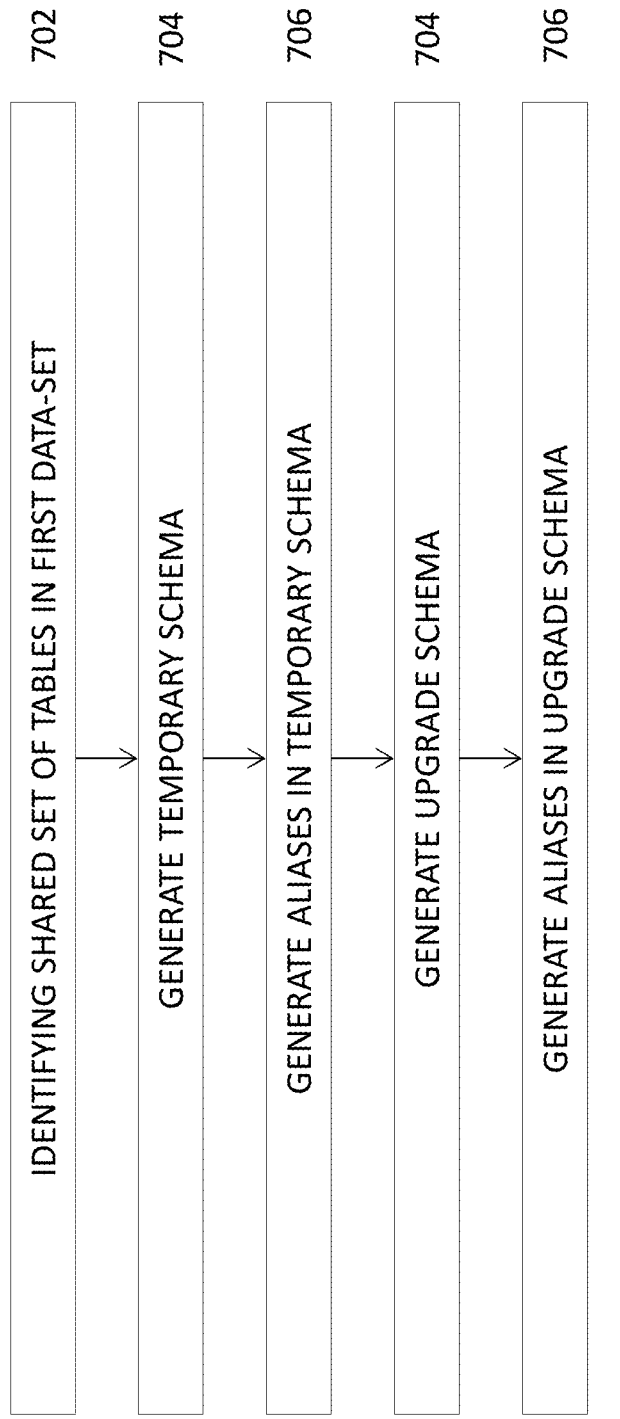
FIG. 7 is a flow diagram illustrating a method of using aliases to perform parallel changes in data accessed by an original system, a temporary system, and an upgraded system.

FIG. 7 is a flow diagram illustrating a method 700 of using aliases to perform parallel changes in data accessed by an original system, a temporary system, and an upgraded system. Such a system allows a sharing of some tables, thereby obviating a requirement for separately synchronizing changes performed (by a developer using the write access) for different users of the application that may be in a different time-period. At 702, shared set of tables are identified. At 704, a temporary database schema is generated. At 706, aliases are generated in the temporary database schema. At 708, an upgrade database schema is generated. At 708, aliases are generated in the upgrade database schema. Some aliases in the temporary database schema point to a same data in the first data-set that is pointed by some other aliases in the upgrade database schema. Thus, use of shared tables obviates a separate merging, during an upgrade of the application, of data written by different tools and/or systems.

The parallel access, via aliases and by the temporary database schema and the upgrade database schema, works without conflict by using a shared enqueue server. The shared enqueue is used as described below. Synchronization on data changes in shared tables are managed by the database, as there is only one table and one database. Concurrent access is managed by the database. Application server level organization of concurrency via the enqueue server is managed by sharing the enqueue server between the two systems sharing tables. This requires the enqueue server to work with application server instances (for example, work processes) of different versions. The protocol and message content shared between the application server instance and enqueue server are compatible.

This sharing mechanism is used in several situations to perform a user-by-user rollover from one system to another system. For example, the sharing mechanism is used for the roll-over from an original system to a temporary system, which is a roll-over of runtimes with the same version v1→v1; and the sharing mechanism is used for the roll-over from the temporary system to a target system, which is a roll-over of runtimes with different versions v1→v2.

Additional sharing mechanisms that can alternatively be used include (a) shared tables for singletons, and (b) ensuring that no asynchronous tasks run twice.

(a) Shared tables for singletons—These are number ranges, which is a mechanism to provide system wide unique numbers. As these are used by both runtimes, they need to be shared. The synchronization is performed using the database. If singletons require a single process to operate on the persistency (and not two or more processes), this process at some point in time may need to be stopped on the instance which is going down and started on the instance going up.

(b) Ensuring that no asynchronous tasks run twice—It is ensured that the original and temporary system do not both process the same entries (for example, messages, update tasks, and other entries). The tables, which are used for these asynchronous mechanisms (for example, batch and update tasks) and for message queues, are shared. Updates of processes that are run in one instance (for example, an original instance accessing data associated with an original schema) accessing the shared tables can thus be accessed by (or be visible to) another instance (for example, a temporary instance accessing data associated with a temporary schema) as well.

Figure 8:
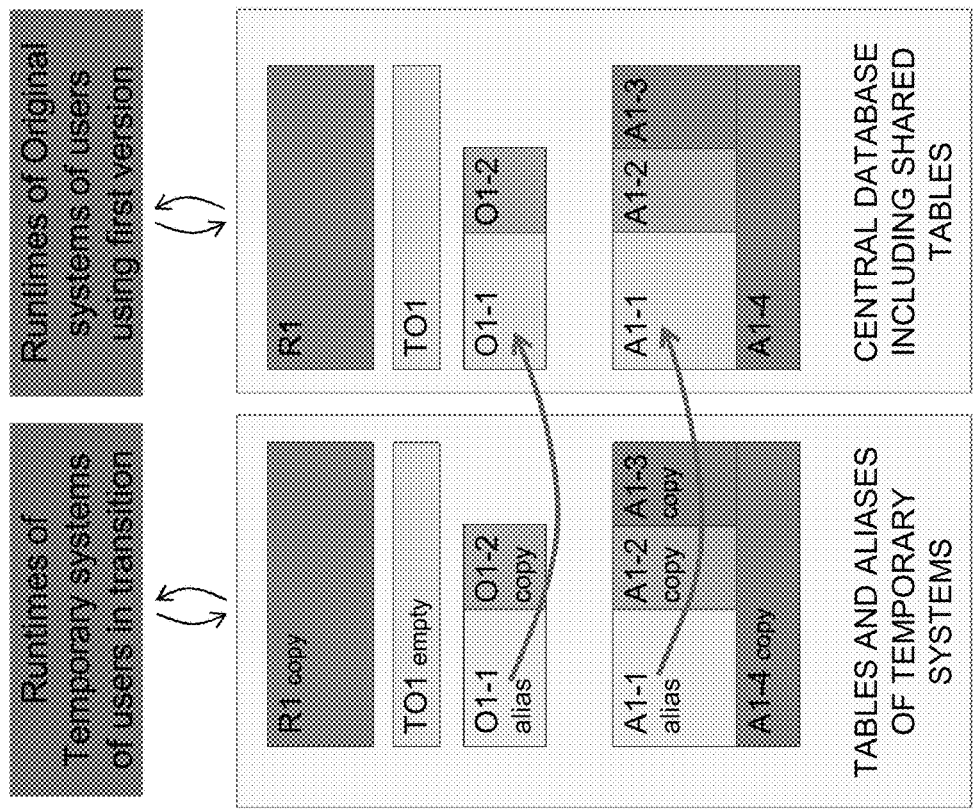
FIG. 8 is a diagram illustrating a use of aliases in a temporary system to access data of shared tables.

FIG. 8 is a diagram 800 illustrating a use of aliases in a temporary system to access data of shared tables. When an upgrade of the application becomes available, a copy of a first portion of the first data-set is generated on a temporary system that includes data arranged according to a temporary database schema. The copy of the first portion of the first data-set includes copies of tables R1, TO1, O1-2, A1-2, A1-3, and A1-4, as shown. Aliases are generated for tables O1-1 and A1-1, data of which is changed by writing (because write access is allowed for these tables) during the upgrade. As the data can change during the upgrade, aliases advantageously allow changes to be performed in a single location (central original system including the first data-set) that is accessed by the temporary system and other systems that have aliases to the data in the single location. For example, if changes are made to data in tables O1-1 associated with the original system, aliases can access the changed data in the original system.

Figure 9:
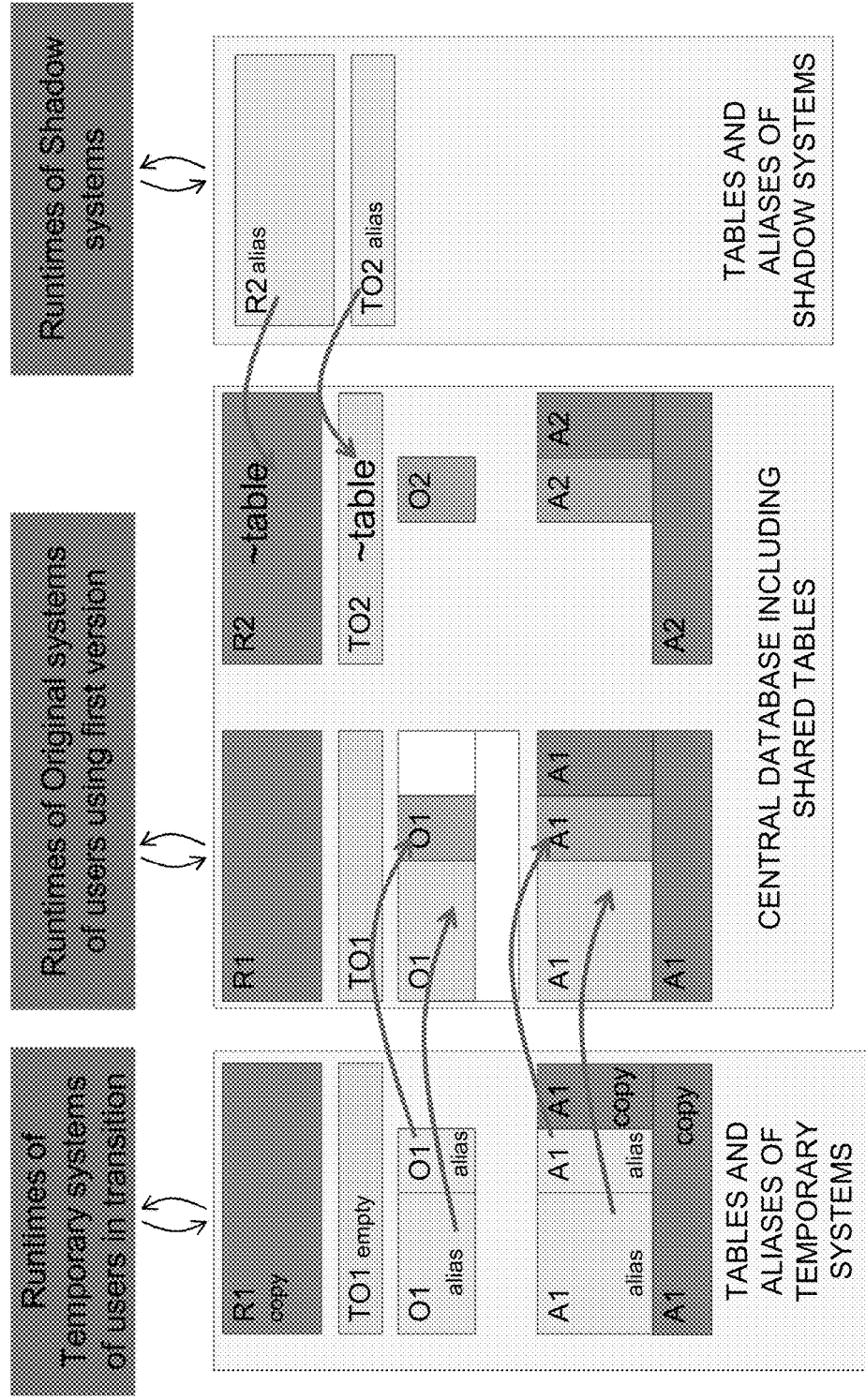
FIG. 9 is a diagram illustrating a use of aliases in a shadow system to access shared tables in a first data-set in a central database, and a use of aliases in a temporary system to access shared tables in the first data-set.

FIG. 9 is a diagram 900 illustrating a use of aliases in a shadow system to access shared tables in a first data-set in a central database, and a use of aliases in a temporary system to access shared tables in the first data-set. The first data-set includes a plurality of tables. The plurality of tables are arranged according to an original database schema that characterizes a first database structure and a second database structure. The first database structure characterizes an arrangement of data in a first version of the application, and the second database structure characterizes a desired arrangement of data in a second/upgraded version of the application. The second database structure is characterized by a shadow database schema. The shadow database schema further includes aliases to access tables R2 and TO2 of the first data-set.

On a temporary system, copies of the tables R1, TO1, O1-2, A1-2, A1-3, and A1-4 are generated. Data of the temporary system is arranged according to a temporary database schema. An access to the data of the temporary database schema is continuously enabled and provided to a user of the application when the upgrade of the application is being performed. The temporary database schema further includes aliases to access tables O1-1 and O1-2 in the first data-set in the central original system. In some implementations, some other aliases can also be generated, such as those shown in diagram 900.

Figure 10:
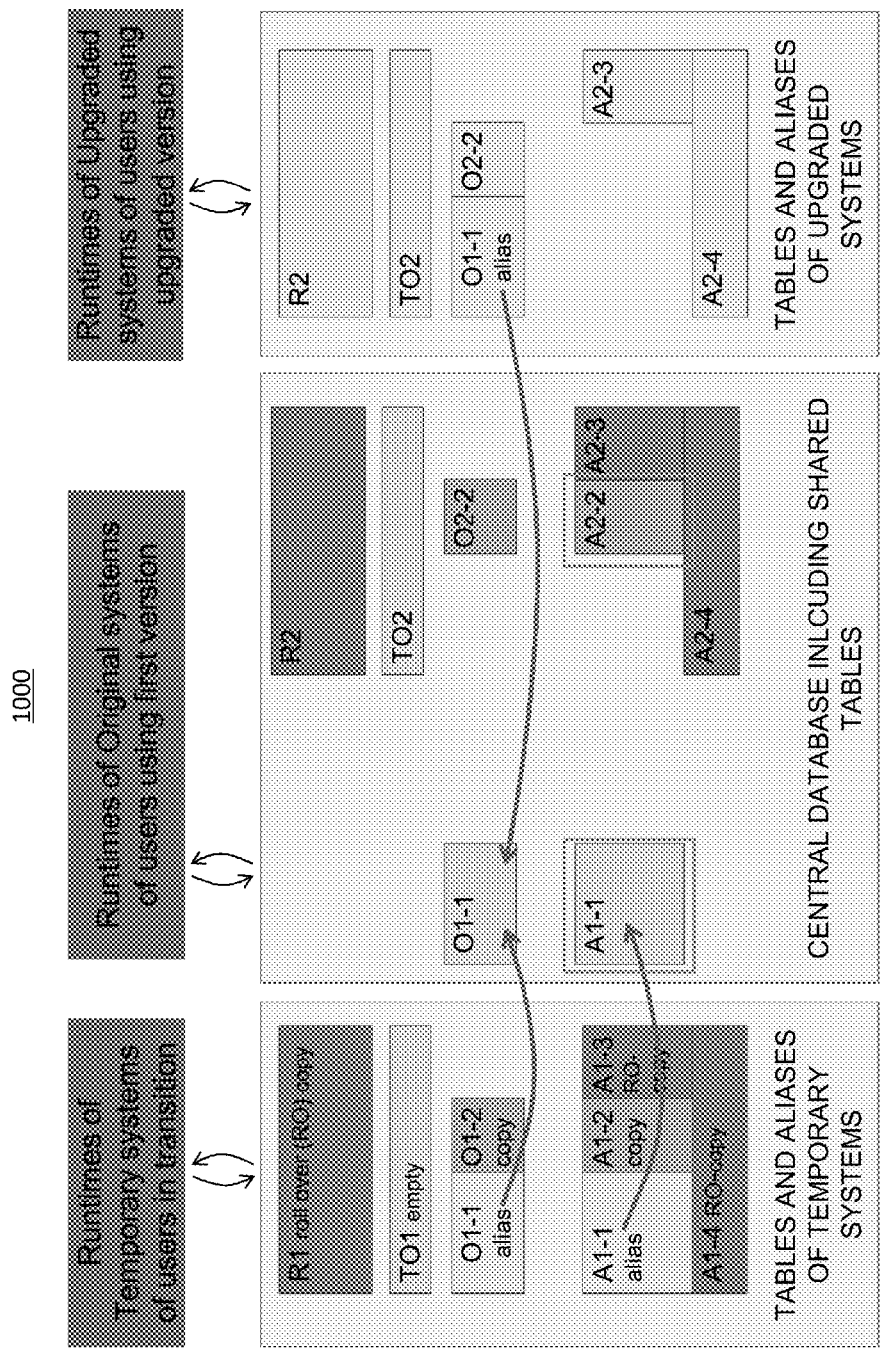
FIG. 10 is a diagram illustrating a parallel use of aliases in a shadow system and aliases in an upgrade system to access shared tables.

FIG. 10 is a diagram 1000 illustrating a parallel use of aliases in a shadow system and aliases in an upgrade system to access shared tables. Based on the upgraded database structure characterized by the shadow database schema and asynchronously for users of the application (that is, on a user-by-user basis), the first data-set is upgraded to generate a second data-set associated with an upgraded application. The second data-set is arranged according to the second/upgraded database structure of an upgrade database schema. The upgrade database schema further includes aliases to access tables O1-1 of the first data-set.

Access to the second data-set is provided after the upgrade of the application and when the second data-set has been tested to contain no significant bugs, errors, or other problems.

Figure 11:
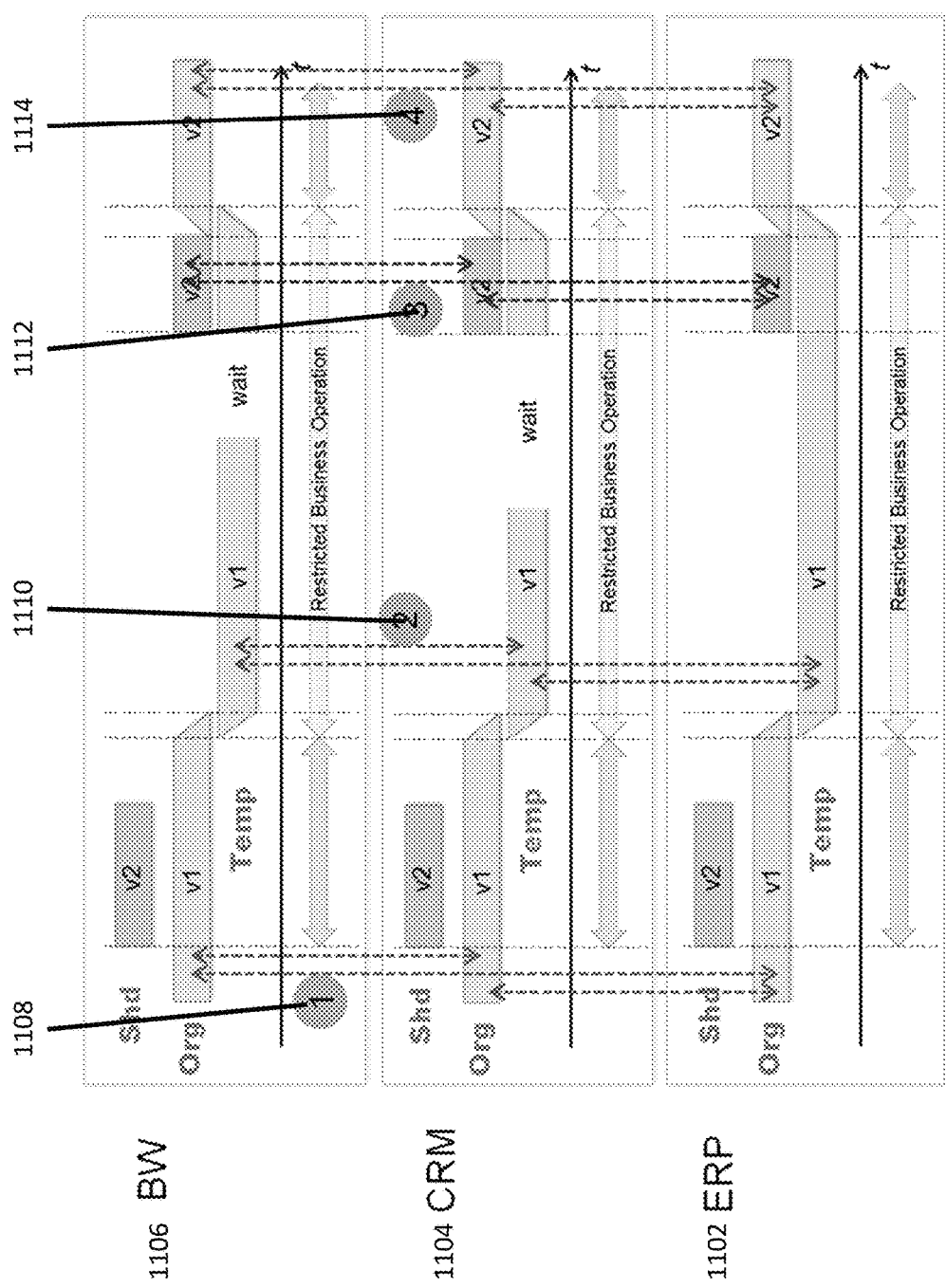
FIG. 11 is a diagram illustrating a continuous provision, in a multi-system computing landscape, of an application to the users during an upgrade of the application and during a testing of the upgrade, and a subsequent implementing of the upgrade.

FIG. 11 is a diagram 1100 illustrating a continuous provision, in a multi-system computing landscape, of an application to the users during an upgrade of the application and during a testing of the upgrade, and a subsequent implementing of the upgrade.

The application can be a distributed application executed over a distributed computing landscape including one or more of: an enterprise resource planning system 1102, a customer relationship management system 1104, a data warehouse system 1106, and other systems. The enterprise resource planning system 1102 is a distributed computing system that can integrate internal and external data across different offices and/or departments (for example, finance, accounting, marketing, sales, and other departments) of an entire business entity. The customer relationship management system 1104 can manage interactions of a business entity with customers and prospective customers. The data warehouse system 1106 is a database that can be created by integrating data from multiple disparate sources. When the application is upgraded from a first version V1 to a second version V2, the computing landscape can also be upgraded from a first version of the landscape to a second version of the landscape.

The enterprise resource planning system 1102, the customer relationship management system 1104, and the data warehouse system 1106 communicate with each other at 1108. An original system includes a first data-set characterizing a first version of the application distributed over the computing landscape. When an upgrade of the application becomes available, a temporary system is set up. The temporary system contains a copy of a portion of the first data-set. Further, the temporary system includes aliases to some shared tables in the first data-set. The temporary system allows the enterprise resource planning system 1102, the customer relationship management system 1104, and the data warehouse system 1106 to continue to communicate via communication channels that is the same as those allowed by the original system.

The enterprise resource planning system 1102, the customer relationship management system 1104, and the data warehouse system 1106 are triggered, at 1110, to move, in a synchronized manner and on a user-by-user basis, to a restricted business operations mode. In the restricted business operations mode, selective access to the data of the first-data set on the temporary system is enabled and provided to a user of the application while access may not be enabled or provided to the first data-set on the original system.

Once any of the enterprise resource planning system 1102, the customer relationship management system 1104, and the data warehouse system 1106 reaches 1112, where testing of second data-set is to be performed, the system waits for other systems to reach 1112. During the testing at 1112, the enterprise resource planning system 1102, the customer relationship management system 1104, and the data warehouse system 1106 continue to communicate via communication channels that are same as those allowed by the original system. It is determined, at 1112, whether the second data-set should be implemented, wherein the second data-set characterizes one of the second version of the application and the second version of the computing landscape. This determining ensures that there are no significant bugs, errors, or other problems associated with the second version.

It is determined at 1112 that the second data-set should be implemented. So, the second data-set characterizing the second version V2 is implemented at 1116.

Thus, advantageously, enterprise resource planning system 1102, the customer relationship management system 1104, and the data warehouse system 1106 is connected in parallel, and upgraded simultaneously.

Figure 12:
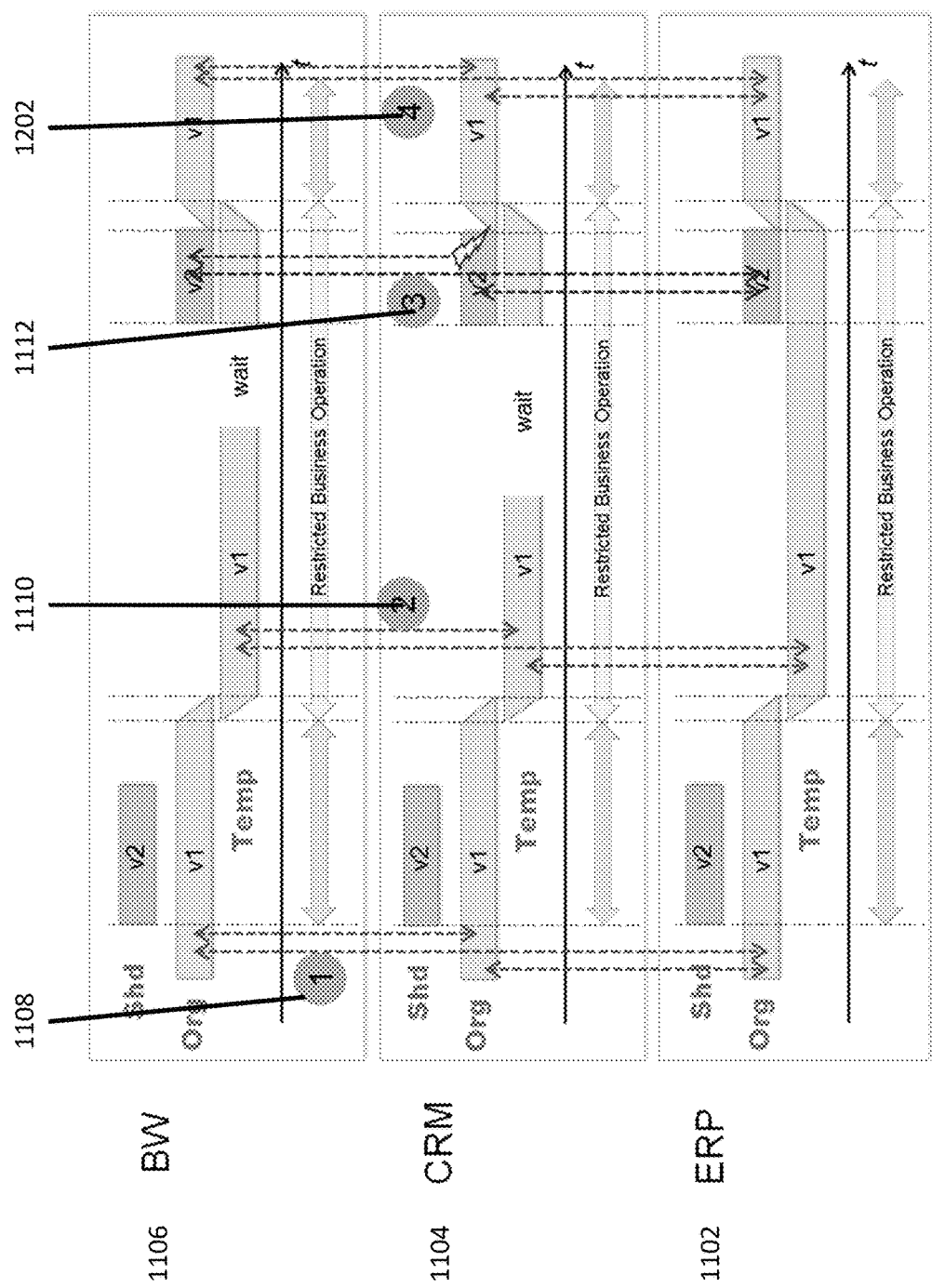
FIG. 12 is a diagram illustrating a continuous provision, in a multi-system computing landscape, of an application to the users during an upgrade of the application and during a testing of the upgrade, and a subsequent rolling-back of changes performed during the upgrade.

FIG. 12 is a diagram 1200 illustrating a continuous provision, in a multi-system computing landscape, of an application to the users during an upgrade of the application and during a testing of the upgrade, and a subsequent rolling-back of changes performed during the upgrade.

The operations at 1108, 1110, and 1112 are performed, as noted above. However, it is determined at 1112 that the second data-set should not be implemented. In such a case, the changes in the upgrade are rolled-back (shown with the electric spark symbol) so as to re-obtain the first data-set. The first data-set characterizing the first version V1 is then implemented at 1202.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:
1. A method comprising:
    obtaining, using one or more data processors, a first data-set characterizing a first version of an application, the first data-set comprising a plurality of tables arranged according to an original database schema characterizing a first database structure and a second database structure, the first database structure characterizing an arrangement of data in the first version of the application, the second database structure characterizing a desired arrangement of data in a second version of the application;

generating, using one or more data processors, a copy of a first portion of the first data-set on a temporary system, data of the temporary system being arranged according to a temporary database schema, the temporary database schema comprising a first set of one or more aliases to access a second portion of the first data-set, the first set of one or more aliases preventing generation of a copy of the first data-set in entirety, a selective access to the data of the temporary database schema being continuously enabled and provided to a client computer operated by a user when the upgrade of the application is being performed, the temporary system being operably coupled to the client computer via a communication network;

upgrading, using one or more data processors, the first data-set to generate a second data-set associated with an upgraded application, the updating being based on the second database structure and being performed asynchronously for a plurality of users, the second data-set being arranged according to the second database structure of an upgrade database schema, the upgrade database schema comprising a second set of one or more aliases to access a third portion of the first data-set; and enabling, using one or more data processors, access by the client computer to the second data-set after the upgrade of the application.

2. The method of claim 1, wherein the application is executed in a computing landscape comprising an enterprise resource planning system, a customer relationship management system, and a business warehouse system.

3. The method of claim 1, wherein:
the first version of the application is an original version of the application; and
the second version of the application is an upgraded version of the application.

4. The method of claim 1, wherein:
the plurality of tables comprise a first plurality of tables associated with the first database structure and a second plurality of tables associated with the second database structure;
the first plurality of tables comprises repository tables, temporary data operational tables, operational tables, and application tables that are associated with the first database structure; and
the second plurality of tables comprises repository tables, temporary data operational tables, operational tables, and application tables that are associated with the second database stricture.

5. The method of claim 1, further comprising:
generating, using one or more data processors, a shadow database schema, the shadow database schema characterizing the second database structure, the shadow database schema comprising a third set of one or more aliases to access a fourth portion of the first data-set.

6. The method of claim 5, wherein the fourth portion of the first data-set comprises:
repository tables associated with the second database structure; and
temporary data operational tables associated with the second database structure.

7. The method of claim 1, wherein the first portion of the first data-set comprises:
operational tables that are not imported during the upgrade and that are modified online during the upgrade;
application tables that are not imported during the upgrade and that are modified online during the upgrade;
application tables that are not imported during the upgrade and that are modified offline during the upgrade; and
application tables that are imported during the upgrade and that are not modified during the upgrade.

8. The method of claim 1, wherein the second portion of the first data-set comprises:
operational tables that are not imported during the upgrade and that are not modified during the upgrade; and
application tables that are not imported during the upgrade and that are not modified during the upgrade.

9. The method of claim 1, wherein the third portion of the first data-set comprises operational tables that are not imported during the upgrade and that are not modified during the upgrade.

10. A non-transitory computer program product storing instructions that, when executed by at least one programmable processor, cause the at least one programmable processor to perform operations comprising:

obtaining a first data-set characterizing a first version of an application, the first data-set comprising a plurality of tables arranged according to an original database schema characterizing a first database structure and a second database structure, the first database structure characterizing an arrangement of data in the first version of the application, the second database structure characterizing a desired arrangement of data in an upgraded version of the application;

generating a copy of a first portion of the first data-set, the copy being generated on a temporary system, data of the temporary system being arranged according to a temporary database schema, the temporary database schema comprising a first set of one or more aliases to access a second portion of the first data-set, the first set of one or more aliases preventing a need for generation of a copy of the first data-set in entirety, a selective access to the data of the temporary database schema being continuously enabled for a client computer operated by a user when the upgrade of the application is being performed, the temporary system being operably coupled to the client computer via a communication network;

upgrading the first data-set to generate a second data-set associated with an upgraded application, the upgrading being based on the second database structure and being performed asynchronously for a plurality of users, the second data-set being arranged according to the second database structure of an upgrade database schema, the upgrade database schema comprising a second set of one or more aliases to access a third portion of the first data-set; and enabling, for the client computer operated by the user, access to the second data-set after the upgrade of the application.

11. The computer program product of claim 10, wherein:
the first data-set is obtained from a central database implemented at a central server; and
the central server is accessed by temporary system via a network.

12. The computer program product of claim 11, wherein the network is internet.

13. The computer program product of claim 10, wherein:
the plurality of tables comprise a first plurality of tables associated with the first database structure and a second plurality of tables associated with the second database structure;
the first plurality of tables comprises repository tables, temporary data operational tables, operational tables, and application tables that are associated with the first database structure; and
the second plurality of tables comprises repository tables, temporary data operational tables, operational tables, and application tables that are associated with the second database structure.

14. The computer program product of claim 10, wherein the first portion of the first data-set comprises:
operational tables that are not imported during the upgrade and that are modified online during the upgrade;
application tables that are not imported during the upgrade and that are modified online during the upgrade;
application tables that are not imported during the upgrade and that are modified offline during the upgrade; and
application tables that are imported during the upgrade and that are not modified during the upgrade.

15. The computer program product of claim 14, wherein the second portion of the first data-set comprises:
operational tables that are not imported during the upgrade and that are not modified during the upgrade; and
application tables that are not imported during the upgrade and that are not modified during the upgrade.

16. The computer program product of claim 15, wherein the third portion of the first data-set comprises operational tables that are not imported during the upgrade and that are not modified during the upgrade.

17. A system comprising:
at least one hardware programmable processor; and
a machine-readable medium storing instructions that, when executed by the at least one hardware programmable processor, cause the at least one hardware programmable processor to perform operations comprising:
receiving a first data-set characterizing a first version of an application, the first data-set comprising a plurality of tables arranged according to an original database schema characterizing a first database structure and a second database structure, the first database structure characterizing an arrangement of data in the first version of the application, the second database structure characterizing a desired arrangement of data in an upgraded version of the application;
generating a copy of a first portion of the first data-set, the copy being generated on a temporary system, data of the temporary system being arranged according to a temporary database schema, the temporary database schema comprising a first set of one or more aliases to access a second portion of the first data-set, the first set of one or more aliases preventing generation of a copy of the first data-set in entirety, a selective access to the data of the temporary database schema being continuously provided to a client computer of a user when the upgrade of the application is being performed, the temporary system being operably coupled to the client computer via a communication network;
upgrading the first data-set to generate second data-set associated with an upgraded application, the upgrading being based on the second database structure and being performed asynchronously for a plurality of users, the second data-set being arranged according to the second database structure of an upgrade database schema, the upgrade database schema comprising a second set of one or more aliases to access a third portion of the first data-set; and
providing, to the client computer operated by the user, access to the second data-set after the upgrade of the application.

18. The system of claim 17, wherein:
the first portion of the first data-set comprises:
operational tables that are not imported during the upgrade and that are modified online during the upgrade;
application tables that are not imported during the upgrade and that are modified online during the upgrade;
application tables that are not imported during the upgrade and that are modified offline during the upgrade; and
application tables that are imported during the upgrade and that are not modified during the upgrade;
the second portion of the first data-set comprises:
operational tables that are not imported during the upgrade and that are not modified during the upgrade; and
application tables that are not imported during the upgrade and that are not modified during the upgrade; and
the third portion of the first data-set comprises operational tables that are not imported during the upgrade and that are not modified during the upgrade.

19. The system of claim 17, wherein:
the application is executed in a distributed computing landscape comprising an enterprise resource planning system, a customer relationship management system, and a business warehouse system;
the first version of the application characterizes a first version of the distributed computing landscape; and
the upgraded version of the application characterizes an upgraded version of the distributed computing landscape.

20. The method of claim 1, wherein the first portion, the second portion, and the third portion of the first data-set are separate from each other.

* * * * *